May 19, 1942.  L. A. SELDOMRIDGE  2,283,390
EGG HOLDING DEVICE
Filed Dec. 14, 1938

INVENTOR.
LONNIE A. SELDOMRIDGE.
BY
H. A. Duckman
ATTORNEY.

Patented May 19, 1942

2,283,390

UNITED STATES PATENT OFFICE 2,283,390

EGG HOLDING DEVICE

Lonnie Alfred Seldomridge, Long Beach, Calif.

Application December 14, 1938, Serial No. 245,591

5 Claims. (Cl. 65—22)

The object of my invention is to provide an inexpensive, efficient and sanitary device for holding and handling eggs, more particularly to hold boiled eggs while hot, to prevent burning the fingers; also to facilitate in opening boiled eggs and holding the divided parts thereof while removing the egg meats from the shells in serving.

To more fully illustrate and describe the most desirable means to accomplish the object of my invention, I refer to the accompanying drawing in which like numbers refer to like members of pairs.

Figure 1:
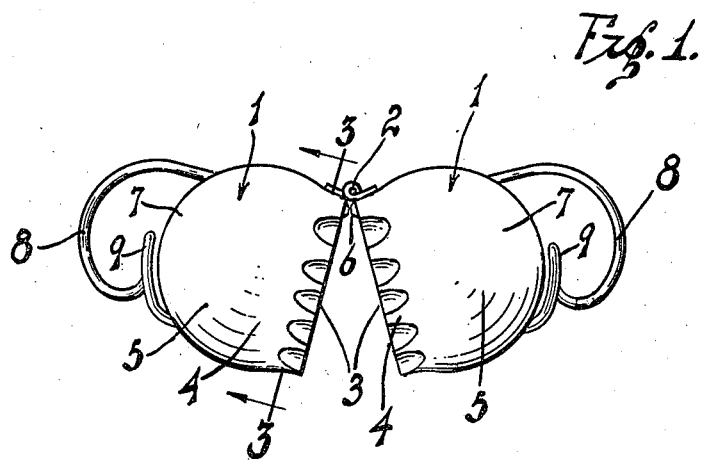
Figure 2:
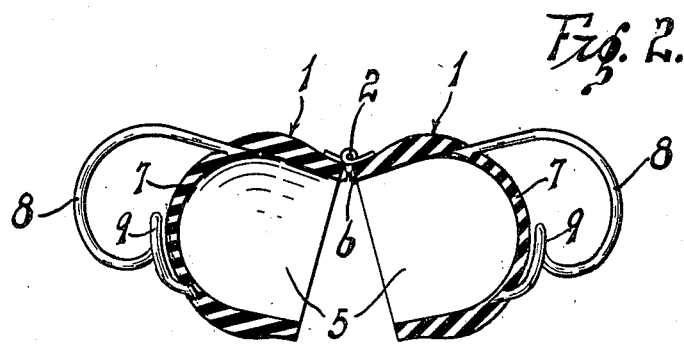
Figure 3:
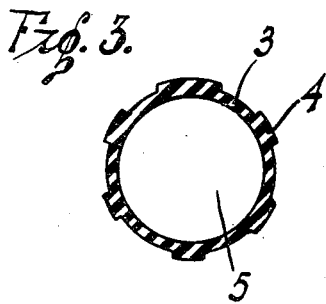

Figure 1 is a side elevation of the device. Figure 2 is a sectional view of the same. Figure 3 is a sectional view taken on line 33 of Figure 1. In the drawing 1 is a pair of egg holding cups being made of rubber or other resilient material, said cups 1 as shown in Figure 3 being connected at the rim by a hinge 2 thereby forming a receptacle adapted to receive an egg, each cup grasping its respective half of the egg by vacuum and friction, substantially to prevent the half shells from turning while the egg meat is being removed, the edge portions of said cups being formed by thin segments 3 for elasticity, said segments being divided by stiffening fingers 4 projecting from and being an integral part of the main body portion 5, said main body portion 5 being heavy enough to retain the cups in shape, also to afford a body for attaching the hinge 2, and suitable handles 8, thereto, the heavy portion of the rim of the cups near the hinge at 6 being projected slightly beyond the regular plane of the rim, thereby abutting while the remainder of the rim stands slightly apart to afford an opening through which to break the egg. The dome portion 7 of cups 1 being thin or flexible, thereby are adapted to be pressed inwardly to eject the egg shells from the cups. The handles 8 arching over dome portion 7 may be molded into the main body portion 5 or otherwise suitably attached thereto as shown in Figure 2, said handles 8 having a spur 9 projecting inwardly, over and in close proximity to the dome portion 7 to a point approximately in the center, the remaining portion of dome 7 being exposed within the enclosure of the handles 8 for contact with the fingers in removing the egg shells from the cups.

In using the device the thumb and third finger is inserted in the opening, of the handles 8, the first and second fingers on the back or hinge portion of the receptacle, the receptacle is then opened and placed over an egg with the hinge transversely to the central portion of the egg. The cups are brought down to envelop the ends of the egg by pressing together on the inwardly projecting spurs 9, the hand is then turned upward exposing a central transverse portion of the egg between the rims of the cups, thus with a knife, or other suitable instrument held in the opposite hand, the exposed portion of the egg is cracked and pried apart, the receptacle is then held in open position exposing the egg meats for removal from the shells by using a knife or other instrument, held in the other hand. The egg shells are then removed by pressing inwardly on the flexibly resilient dome portion 7, which is in ready contact with the fingers as the receptacle is held in open position.

Having described my invention, I claim:

1. A device adapted to handle a hot boiled egg, to facilitate in removal of the egg meats from the shell, comprising an oval receptacle formed by a pair of cups connected by a hinge at the rim, and having ring handles extending from and arching over the dome portion or bottom of said cups, said handles having an inwardly projecting spur.

2. A device adapted to hold an egg, comprising a pair of cups hingedly connected at the rim thereof, a ring-like handle on each of the cups, said handles arching over the outer or bottom portion of each of the cups, said handles being immediately adjacent the cups and the outer surface of the cups serving as a closure for the inner part of the handles.

3. A device adapted to hold an egg, comprising a pair of cups hingedly connected at the rim thereof, a handle on the outer or bottom portion of each of the cups, a projection on each of the cups adjacent the hinge, said projection abutting to hold the inner edges of the cups slightly spaced, thus providing a space between the cups in which an egg may be broken.

4. A device adapted to hold an egg comprising a pair of cups hingedly connected at the rim thereof, said cups being formed of a yieldable material, a ring-like handle on each of the cups, said handles arching over the outer or bottom portion of each of the cups and being substantially in alignment with a plane passing through the center of both of the cups, said handles being immediately adjacent the cups, and the outer surface of each of the cups serving as a closure for the inner part of the handles.

5. A device adapted to hold an egg comprising a pair of cups hingedly connected at the rim thereof, said cups being formed of a yieldable material, a ring-like handle on each of the cups, said handles arching over the outer or bottom portion of each of the cups and being substantially in alignment with a plane passing through the center of both of the cups, said handles being immediately adjacent the cups, and the outer surface of each of the cups serving as a closure for the inner part of the handles, each of the handles including a spur projecting inwardly over the outer or bottom portion of each of the cups, said spur acting as a reinforcement for the cups.

LONNIE ALFRED SELDOMRIDGE.